United States Patent [19]

Levin et al.

[11] Patent Number: 4,471,915
[45] Date of Patent: Sep. 18, 1984

[54] FOOD PROCESSOR HAVING ENLARGED FEED TUBE WITH SAFETY GUARD

[75] Inventors: Monte L. Levin, New York; Leonard D. Fine, Brooklyn, both of N.Y.

[73] Assignee: Scovill Inc., Waterbury, Conn.

[21] Appl. No.: 408,755

[22] Filed: Aug. 17, 1982

[51] Int. Cl.³ .................. B02C 18/24; B02C 25/00
[52] U.S. Cl. ......................... 241/37.5; 241/282.1
[58] Field of Search ............ 366/206; 241/280, 37.5, 241/92, 36, 282.1, 282.2

[56] References Cited

U.S. PATENT DOCUMENTS 4,184,641  1/1980  Coggiola ...................... 241/37.5
4,227,656  10/1980  Engebretsen ................. 241/280 X Primary Examiner—Mark Rosenbaum
Attorney, Agent, or Firm—Dallett Hoopes

[57] ABSTRACT

Large feed tube is partly obstructed by removable safety guard which when in place actuates safety switch. Thus, even though large vegetables can be processed, it is not possible to insert a human hand when processor is operating.

6 Claims, 6 Drawing Figures

FOOD PROCESSOR HAVING ENLARGED FEED TUBE WITH SAFETY GUARD

BACKGROUND OF THE INVENTION

1. Field of the Invention

This invention relates to safety means for a food processor. More specifically, this invention relates to means enabling the entry of a large object into the vertical feed tube of a food processor but barring the entry of an object, say as big as a human hand, while the processor is running. Thus, the invention makes the food processor more adaptable to use with the larger objects but at the same time assures safety.

2. Description of the Prior Art

The prior art is replete with many different showings of electric food processors. An example is disclosed in the U.S. Pat. No. 256,318 which issued to me on Aug. 12, 1980. These units generally comprise a housing having a container base with an upstanding spindle and a motor enclosed in the housing. A container sits on the container base and a blade is installed on the spindle within the container. A cover is locked onto the top of the container bayonet fashion and a tongue extends into the housing to close a safety switch. It is only when the safety switch is closed with the cover in place that the motor will run. The container cover has a vertical feed tube through which vegetables and the like are introduced into the container. In the past, the tube has been long enough and of such a dimension that the human hand cannot inadvertently fit inside the tube and be injured by the blade working in the container.

Further examples of food processors employing feed tubes and safety switches are the U.S. Pat. No. 3,892,365 to Verdun which issued July 1, 1975; U.S. Pat. No. 3,985,304 to Sontheimer which issued Oct. 12, 1976; U.S. Pat. No. 4,111,372 to Hicks et al which issued Sept. 5, 1978; U.S. Pat. No. 4,113,188 to Belinkoff which issued Sept. 12, 1978; and U.S. Pat, No. 4,269,917 to Claire et al which issued Aug. 12, 1980.

SUMMARY OF THE INVENTION

One of the drawbacks of the prior art has been that because of these safety limitations, the cross sectional dimensions of the feed tube of the food processor have had to be minimal. This has meant that a large vegetable, or piece of meat, would have to be cut in several pieces before it could be introduced into the feed tube. The art has reluctantly settled for this arrangement because of the strong public drive for safety in consumer appliances.

Under the present invention, it is possible to introduce large vegetables such as apples, large hunks of meat, while at the same time adhering scrupulously to safety requirements demanded by the marketplace.

The present invention accomplishes the above objectives by providing the container cover with an enlarged feed tube but having the safety-switch-operating tongue not on the cover but on a separate wing element pivoted to the cover. This separate wing element is rigid and includes a guard which, when the pivoted wing element is put in closed position, partially occludes the entry of the feed tube. In the closed position, the tongue engages the safety switch. The guard is disposed adjacent the top of the feed tube so that a large chunk of meat or vegetable can be inserted in the feed tube with the guard open and then the guard can be closed over the large chunk or vegetable to process it.

BRIEF DESCRIPTION OF THE DRAWINGS

Further objects and features of the invention will be apparent from a reading of the following specification, including claims and references to the drawings, all of which disclose a non-limiting embodiment of the invention. In the drawings:

DESCRIPTION OF THE PREFERRED EMBODIMENT

Figure 1:
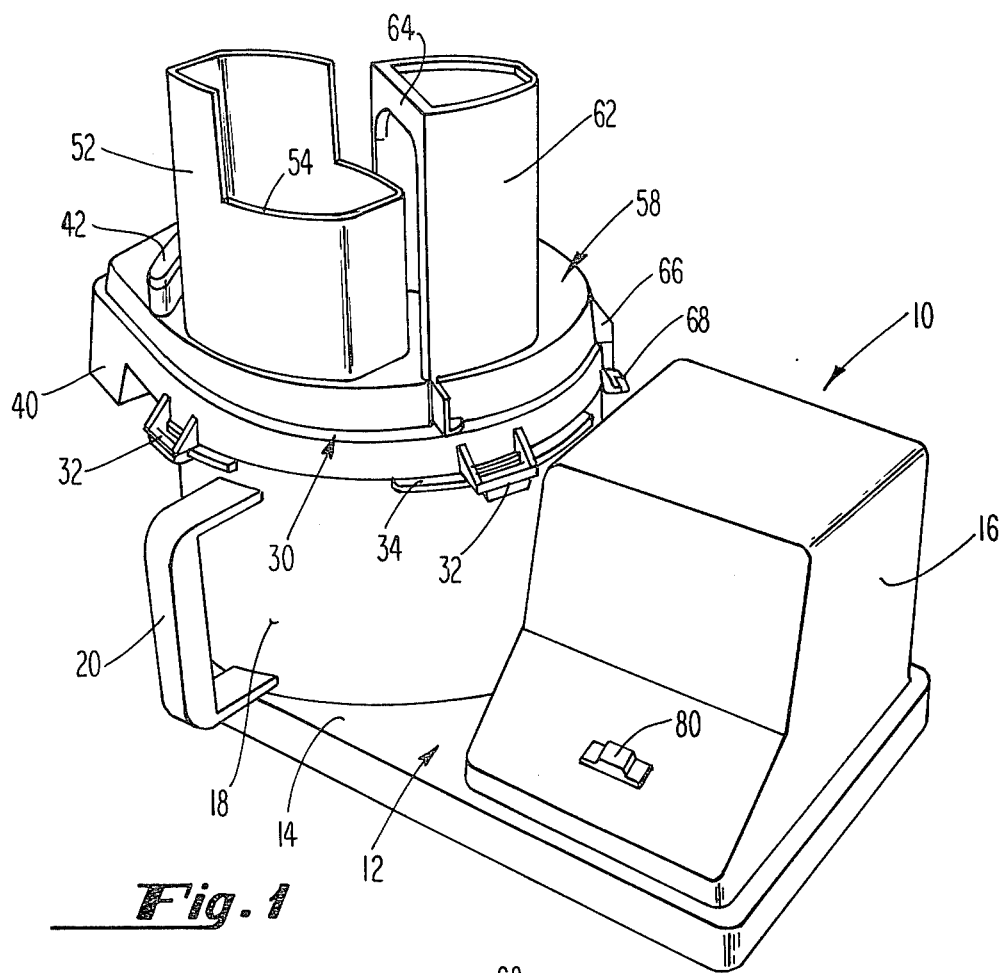
FIG. 1 is a perspective view of a food processor embodying the invention shown with the guard open.

A food processor embodying the invention is shown in FIG. 1 and generally designated 10. It comprises a housing 12 presenting a container base 14 and containing a motor within the motor shell 16. Bayonet-mounted in the usual fashion on the container base is the container 18 having a handle 20.

Extending upwardly from a central position of the container base is the spindle 22 (FIG. 5) which is driven by the motor 24 in shell 16 by means of a belt 26 engaging suitable pulleys. It will be noted that the container 18 is formed with a central annular wall 28 surrounding the spindle 22. The container cover 30 is formed with appropriate locking flanges 32 which engage ribs 34 on the container. The container cover 30 may be formed with a delivery spout 40 extending radially outward and an annular gate 42 closing off the spout and operable by means of a manipulator 44 (FIG. 5).

Figure 2:
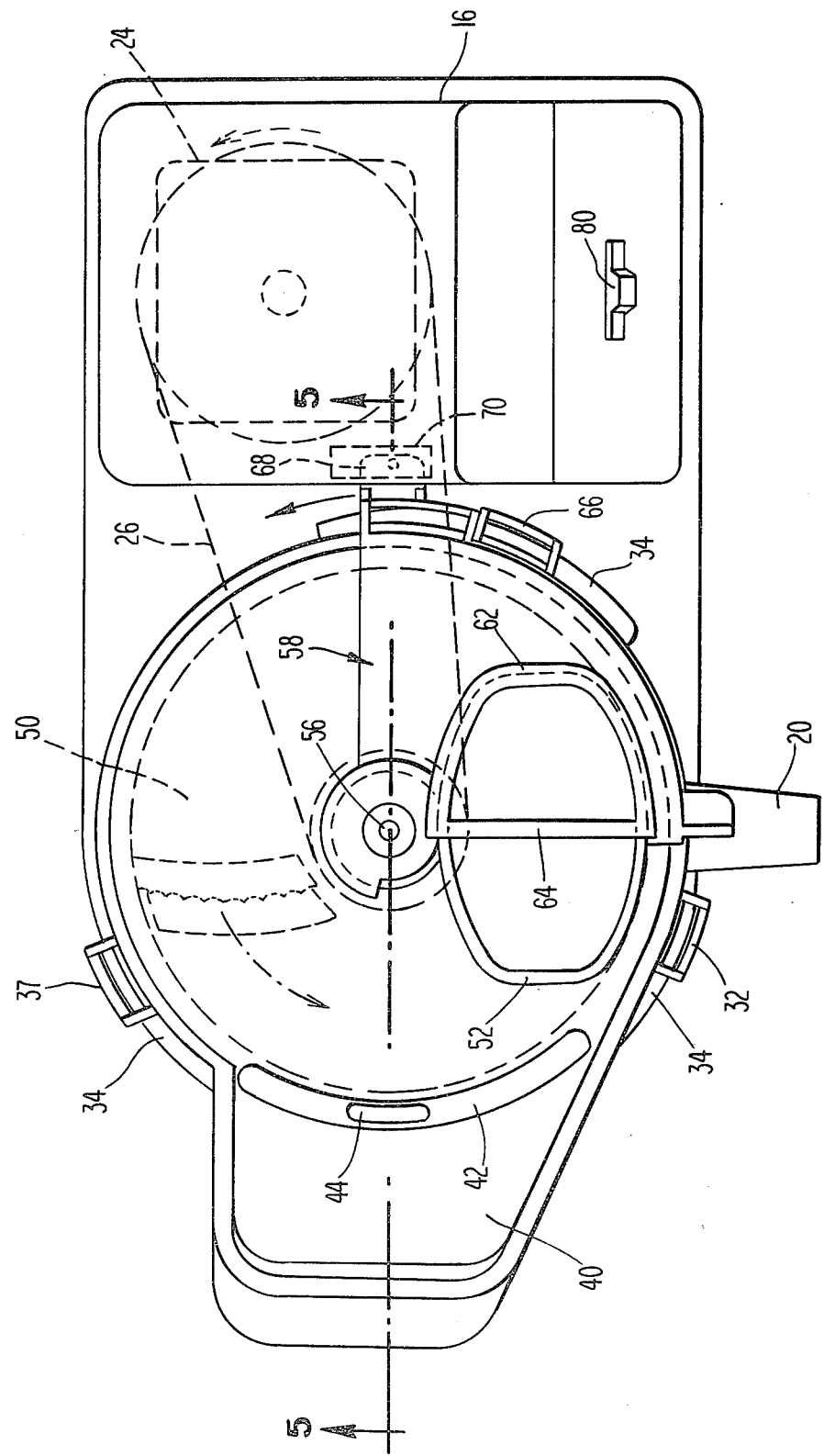
FIG. 2 is a top plan view of the food processor with the guard closed.
Figure 3:
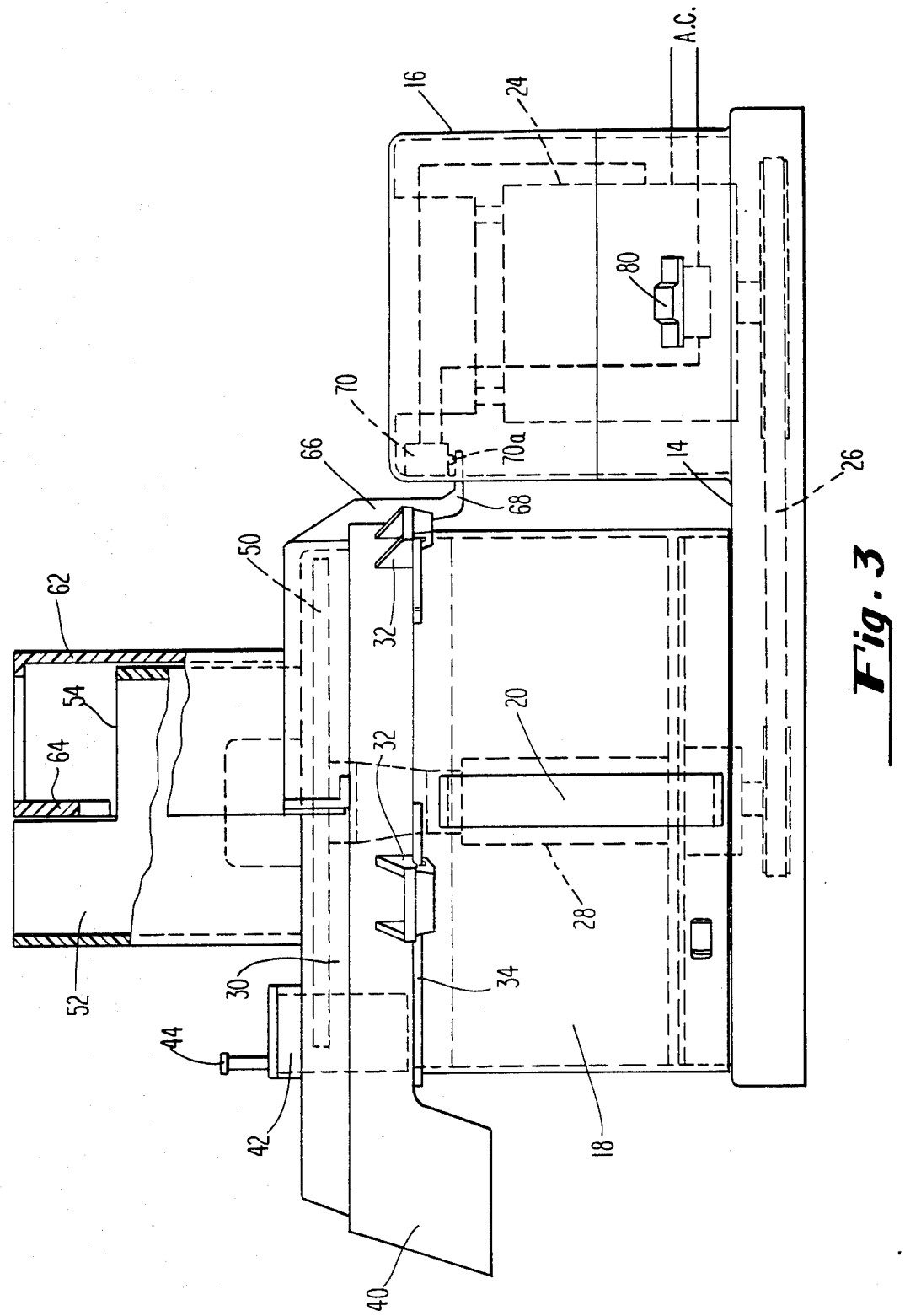
FIG. 3 is a side elevational view of the food processor with the guard closed.
Figure 5:
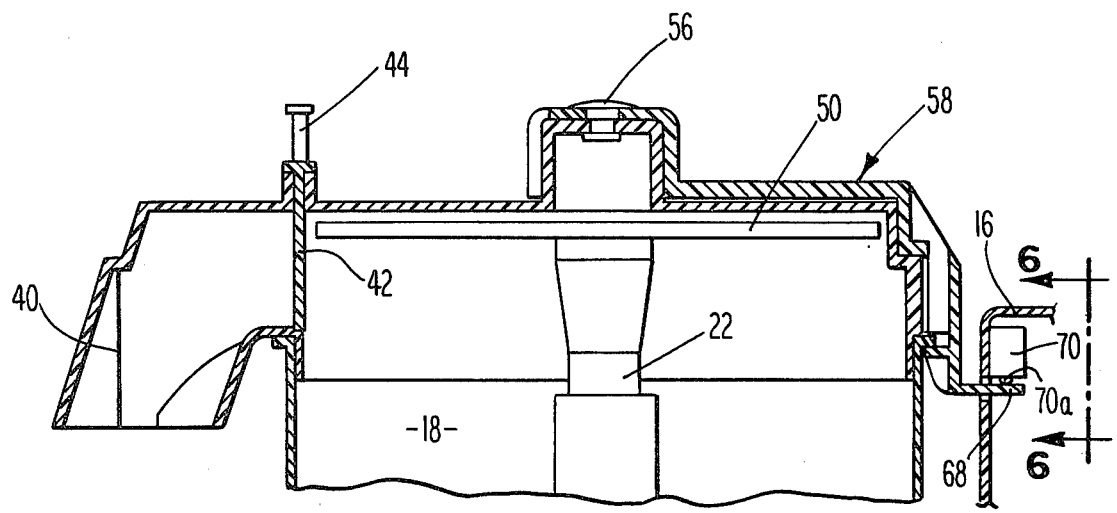
FIG. 5 is a fragmentary sectional view through the container showing the tongue of the wing element engaging the safety switch.

Conventionally mountable and demountable on the spindle 22 is the shredder disc 50 (FIG. 5). As shown in FIG. 3, the container cover is fashioned with a feed tube 52. This is of sizeable dimension adapted to receive large chunks of meat and vegetables, for instance, whole potatoes, a bunch of carrots. As shown in FIG. 1, the feed tube is notched as at 54 over substantially half its dimension. Pivoted on a vertical axis at the center of the container cover by means of a pivoting pin 56 is a wing element 58. The wing element is formed with a horizontal wall 60 and an upward feed tube segment 62 complementing the feed tube 52 and adapted to nest over a portion of the feed tube when the segment 62 is in closed position. The feed tube segment 62 includes a horizontal bar 64 or guard which is disposed transverse of the feed tube opening when the wing element 58 is in closed position (FIG. 2).

The wing element also comprises the locking flange 66 which is adapted to engage the rib 34. Extending down from the locking flange 66 is the safety switch actuator tongue 68.

Figure 6:
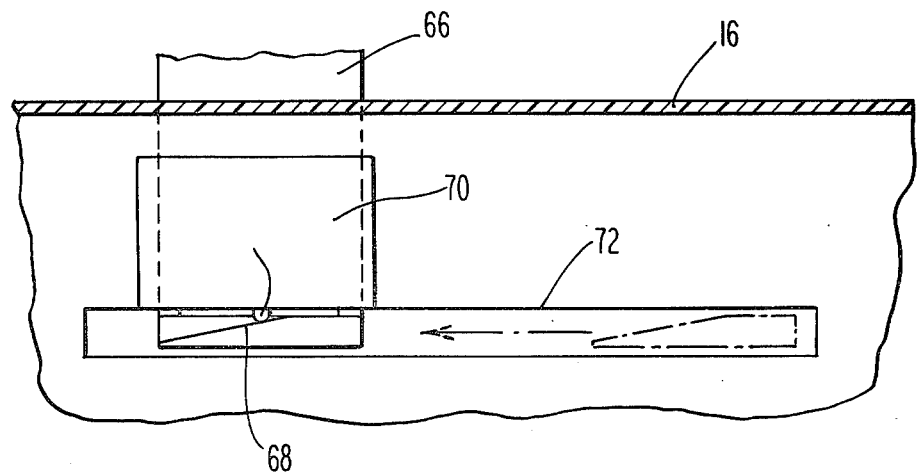
FIG. 6 is an enlarged fragmentary sectional view taken on the line 6—6 of FIG. 5.

Referring to FIG. 3, the motor shell 16 mounts within it a safety switch 70, the actuator 70a which is accessible to the tongue 68 by means of a horizontal slot 72 (FIG. 6) on the wall of the motor shell most nearly adjacent the container 18. As shown in FIG. 6, the tongue may be formed with an incline to actuate the button 70a.

Figure 4:
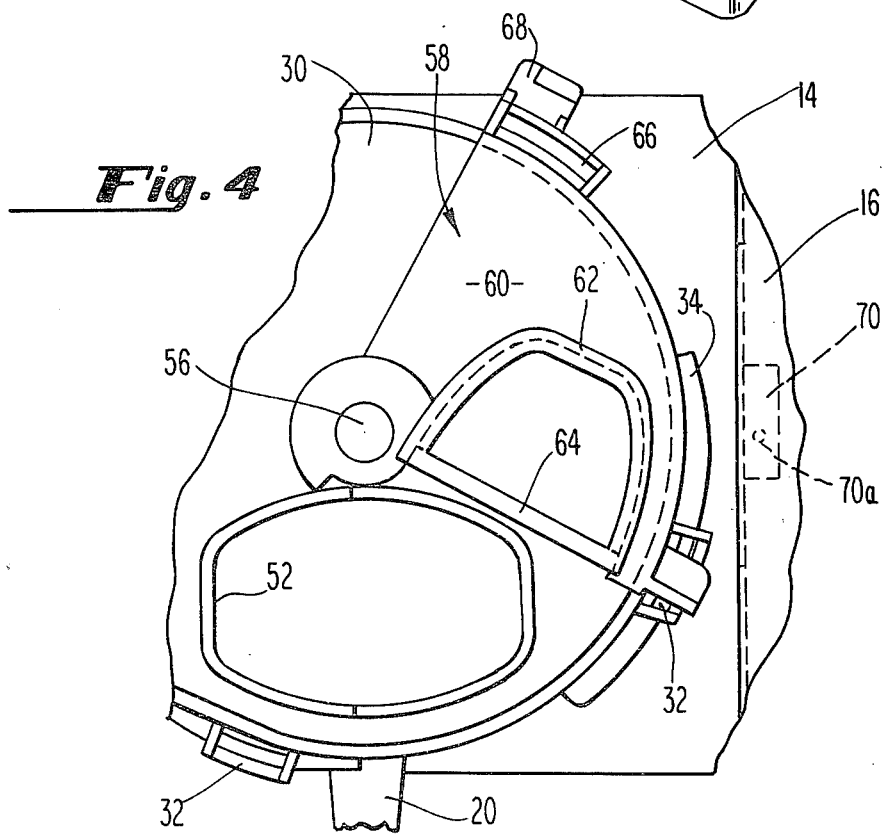
FIG. 4 is a fragmentary top view of the top of the container with the guard open.

In operation, with the container locked onto the container base 14 and the shredder disc or other tool 50 mounted on the spindle 22, the operator places the cover 30 on the container and turns it so that the locking flanges 32 engage the ribs 34 respectively. With the feed tube segment 62 open as shown in FIG. 1, the operator places the large object to be processed in the tube 52. With the wing element 58 including the tongue 68 and the feed tube segment 62 in the position shown in FIG. 1, the motor 24 and shell 16 will not operate. At this point, the operator pivots the wing element 58 clockwise as shown in FIG. 4 so that the segment 62 covers a portion of the feed tube and the guard 64 comes to rest, bisecting the entry of the feed tube as shown in FIG. 3. At this point, the tongue 68 has been moved along with the rest of the wing element so that the tongue engages in the slot 72 and actuates the actuator button 70a of switch 70. The main control switch 80 of the unit (FIG. 3) may now be effectively activated. In this position of the wing element, the locking flange 66 engages the rib 34 adjacent the switch 70.

With the main switch moved to actuating position, the motor 24 drives the disc 50 to process the large vegetable or other object disposed in the feed tube. A pusher may be used to advance the processing as is conventional. It will be understood that even with the wing element closed as shown in FIG. 2, smaller pieces of vegetable may be inserted directly through the openings on either side of the guard 64 and the shredder operating in the usual way.

Thus, it will be seen that with the wing element in closed position, the guard 64 does not preclude operation on smaller pieces of vegetables, meats, etc., but at the same time prevents the extension of a human hand into the feed tube. With the feed tube segment 62 pivoted open with the rest of the wing element 58, however, an extremely large object may be inserted in the feed tube 52 which can then be processed after the wing element is swung in a closed position with the guard 64 in place at the top of the feed tube and the tongue 68 actuating the safety switch 70.

While the invention has been described in only a single form, it is not so limited but is susceptible of many changes. What is desired in the patent coverage on this subject is the scope of the invention as defined by the following claim language and equivalents thereof.

I claim:
1. A food processor comprising:
   (a) a housing containing a motor and presenting a container base and a spindle on the container base driven by the motor;
   (b) a container surrounding the spindle and supported on the container base and having an open top;
   (c) blade means in the container mounted on the spindle;
   (d) safety switch means mounted on the housing;
   (e) cover means for the container having a vertical feed tube through which food may be introduced into the container; and
   (f) wing means mounted on the cover and movable with respect to the cover between a closed position and an open position and including:
      (1) a guard which in the closed position of the wing means is disposed across the top of the feed tube to preclude the entry thereinto of large objects when the processor is running; and
      (2) an actuating tongue engaging and closing the safety switch when the wing means is in closed position and the guard is across the top of the feed tube;
   whereby a large object may be first introduced to the feed tube and the wing means then may be brought closed to permit safely the processing of the large object already in the feed tube.

2. A food processor as claimed in claim 1 wherein the cover may be locked on the container and the wing means may be moved into closed position only when the cover is in locked position.

3. A food processor as claimed in claim 1 wherein the wing means is pivoted about a vertical axis.

4. A food processor as claimed in claim 3 wherein the wing means is pivoted at the center of the cover.

5. A food processor as claimed in claim 4 wherein the container is locked on the container base by a bayonet fitting and the cover is locked on the container by a bayonet fitting, both fittings turning to lock in the same sense of rotation that the wing means pivots to closed position.

6. A food processor as claimed in claim 1 wherein in open position of the wing means, the guard is out of the way of the top of the tube and the tongue does not engage the safety switch.

* * * * *

UNITED STATES PATENT OFFICE
CERTIFICATE OF CORRECTION

Patent No. 4,471,915  Dated September 18, 1984

Inventor(s) Monte L. Levin and Leonard D. Fine

It is certified that error appears in the above-identified patent and that said Letters Patent are hereby corrected as shown below:

On the title page, Item [73] should read

--         Sears Roebuck and Co.
           Chicago, Illinois     --.

Signed and Sealed this

Twelfth Day of March 1985

[SEAL]

Attest:

DONALD J. QUIGG

Attesting Officer     Acting Commissioner of Patents and Trademarks